United States Patent [19]

Motoyama

[11] Patent Number: 4,920,416
[45] Date of Patent: Apr. 24, 1990

[54] METHOD AND APPARATUS FOR DETECTING A DESIRED TELEVISION SIGNAL

[75] Inventor: Tsutomu Motoyama, Knoxville, Tenn.

[73] Assignee: North American Philips Corp., New York, N.Y.

[21] Appl. No.: 169,793

[22] Filed: Mar. 17, 1988

[51] Int. Cl.$^5$ .......................... H04N 5/60; H04N 1/16
[52] U.S. Cl. ...................................... 358/198; 455/229
[58] Field of Search ............... 358/198, 188, 196, 190, 358/191.1, 193.1, 195.1; 455/177, 181, 192, 200, 229, 134, 136

[56] References Cited

U.S. PATENT DOCUMENTS

| | | | |
|---|---|---|---|
| 4,241,495 | 12/1980 | Blatter | 455/182 |
| 4,527,196 | 7/1985 | Hovens | 358/188 |
| 4,633,495 | 12/1986 | Schotz | 358/198 |
| 4,646,150 | 2/1987 | Robbins | 358/198 |

*Primary Examiner*—Tommy P. Chin
*Attorney, Agent, or Firm*—Emmanuel J. Lobato; Marianne R. Rich

[57] ABSTRACT

A detector indicates the presence of a desired signal when both of at least two conditions occur. The first condition requires the presence of a selected frequency in an input signal and a second condition requires the amplitude of the input signal at the selected frequency to fall within a predetermined range. A third condition requires that one or both of the first and second condition have a duration of at least a selected period of time. In one embodiment, the detector indicates the presence of a stereo audio signal in a television transmission program when (1) a pilot frequency (15.734 khz) is present in the composite baseband, (2) the signal amplitude at the pilot frequency corresponds to a frequency deviation of not more than 5.5 khz and not less than 4.5 khz from the 4.5 mhz carrier frequency, and (3) the two aforementioned conditions exist for a predetermined period of time, preferably about one millisecond. In another embodiment, the detector indicates the presence of a second audio program (SAP) in a television transmission program when (1) the SAP carrier frequency (78.67 khz) is present in the composite baseband, (2) the signal amplitude at the SAP carrier frequency corresponds to a deviation from the sound carrier signal of not more than 16.5 khz and not less than 13.5 khz, and (3) the aforementioned two conditions are present for a predetermined period of time, preferably about one millisecond.

17 Claims, 1 Drawing Sheet

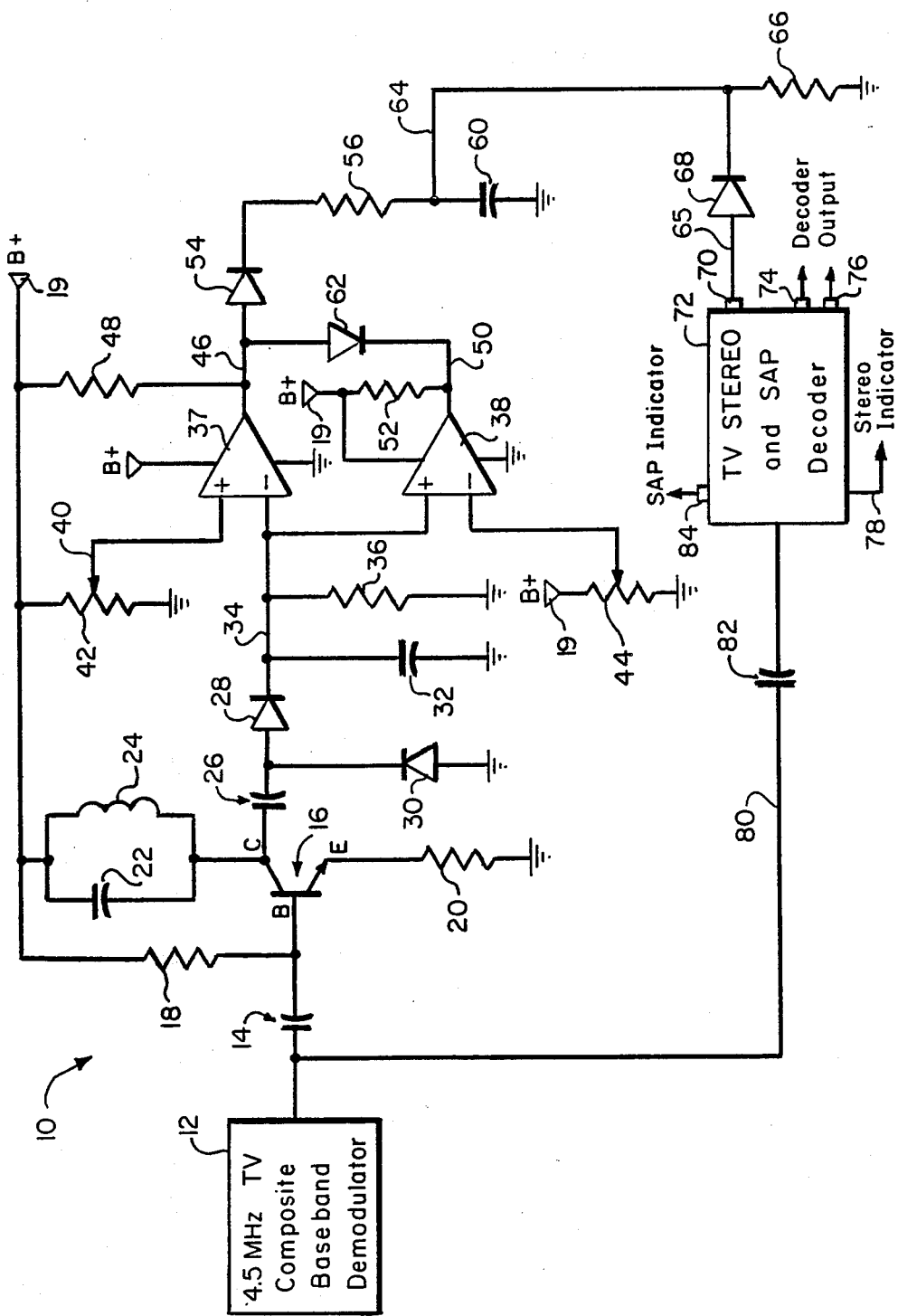

METHOD AND APPARATUS FOR DETECTING A DESIRED TELEVISION SIGNAL

FIELD OF THE INVENTION

The present invention relates to signal detectors for television receivers and particularly relates to a signal detector that requires (1) the presence in an input signal of a selected frequency, (2) that the signal amplitude at the selected frequency be within a predetermined range, and (3) that the two aforementioned conditions exist for a selected period of time.

BACKGROUND OF INVENTION

A multichannel television system is used in the United States that is commonly referred to as the BTSC system (Broadcast Television System Committee) in which stereo composite signals are transmitted with a pilot signal at a frequency of 15.734 khz. The pilot signal is FM modulated onto a 4.5 mhz sound carrier signal and has an amplitude magnitude that corresponds to a five khz (plus or minus 10%) deviation from the sound carrier. Receivers that are designed to receive and reproduce television stereo sound usually include circuitry that determines whether the signal is mono or stereo and, based on this determination, the television receiver switches between mono and stereo modes of operation. One way to make the stereo/mono determination is to monitor the presence of the pilot signal which would indicate that a stereo audio signal is being received. However, the noisy environment of most television receivers and the presence of harmonics of horizontal scan frequency in the television signal may interfere with the accurate determination of whether the pilot signal is present. Noise and harmonics are a special problem in most cable television systems, and, unless precautions are taken, the television receiver may be fooled into constantly switching between the two modes (stereo and mono) of operation.

A similar problem arises in connection with the detection of a second audio program (SAP) in a television signal. In the BTSC system, the SAP signal has a carrier signal appearing in the composite baseband at a frequency of 78.67 khz with an amplitude corresponding to a 15 khz (plus or minus 10%) deviation from the sound carrier which has a frequency of 4.5 mhz. In order to detect a SAP signal, one technique is to detect the presence of the SAP carrier frequency signal in the audio baseband. Again, however, noise and harmonic signals may fool the detector that is attempting to sense the SAP carrier.

SUMMARY OF INVENTION

In order to overcome the aforementioned problems with noise and harmonics, the present invention provides a detector that requires a plurality of conditions before a detect signal is generated, and those conditions include parameters of (1) frequency, (2) amplitude or magnitude, and (3) time or duration. When detecting signals such as the stereo pilot or the SAP carrier, it is unlikely that noise or harmonic signals will satisfy all of the required conditions.

In accordance with one embodiment of the present invention, a detector includes a first circuit for monitoring signals of a predetermined frequency from an input signal to produce a signal corresponding to the amplitude of the signals at the predetermined frequency. A comparator then examines the amplitude of the corresponding signal and produces a preliminary signal when the amplitude magnitude is within a predetermined range. The preliminary signal is monitored by a timing circuit and a detect signal is produced when the preliminary signal has been produced for a selected period of time, preferably on the order of, but greater than, a millisecond. In this detect configuration, a spurious signal is unlikely to cause a false signal because it is unlikely to have the both correct frequency and amplitude and, even if it did meet the frequency and amplitude conditions, it is further unlikely that the spurious signal would maintain these correct conditions for the selected period of time. Thus, by examining the frequency, the amplitude, and the time duration of a suspected pilot signal, the detector of the present invention accurately identifies the pilot signal and false detection signals are minimized.

BRIEF DESCRIPTION OF THE DRAWING

The present invention may best be understood by reference to the following Detailed Description of preferred embodiments when considered in conjunction with the Drawing in which a circuit diagram represents two embodiments of the invention.

DETAILED DESCRIPTION

Referring now to the drawing, a generalized circuit 10 is shown representing the present invention and, by changing the values of the components, the circuit 10 may be adjusted to vary the conditions under which it will produce a detect signal. In the preferred embodiment the circuit 10 is connected to receive the recovered composite baseband output of the 4.5 mhz TV sound demodulator 12 through a capacitor 14 which blocks any DC components in the output. The base of a bipolar transistor 16 is connected to capacitor 14 and also is connected through a resistor 18 to a positive DC power supply 19. The emitter of the transistor 16 is connected through a resistor 20 to ground and the collector is connected to the power supply 19 through a parallel connection of a capacitor 22 and an inductor 24. In this configuration, the transistor 16 and associated components will function as a tuned amplifier that will amplify signals of a selected frequency and will essentially block other frequencies. Thus, the transistor 16 and its associated components may be thought of as a band pass filter and amplifier in which the values of the capacitor 22 and the inductor 24 are chosen to select the frequency that will be amplified.

The output of the transistor 16 appearing at its collector is applied through an AC coupling capacitor 26 to a rectifier/doubler composed of diodes 28 and 30 and capacitor 32. The diodes 28 and 30 function to rectify the AC signal from the transistor 16, and the capacitor 32 functions to smooth the rectified signal so that a substantially DC signal appears at line 34. A resistor 36 is also connected to the cathode of the diode 28 and to ground to provide a load for the DC signal on line 34.

The signal appearing on line 34 is applied as an inverted input to comparator 37 and as a noninverted input to comparator 38. The noninverted input of comparator 37 receives a reference voltage from a pot (potentiometer) 42 that is connected as a voltage divider between the DC power supply 19 and ground and by varying the pot 42, a selected voltage is applied as a reference voltage to the comparator 37. In like manner, a reference voltage is produced by a pot 44 and is applied to the inverted input of the comparator 38. Again, the pot 44 functions as a voltage divider and provides a desired voltage to the inverted input of comparator 38. In this configuration, comparator 37 functions to set an upper threshold and comparator 38 functions to set a lower threshold of a voltage range through which both comparators 37 and 38 will be in an "off⇌" condition.

The output of the comparator 37 appears on line 46, and a resistor 48 is connected between the power source 19 and the output line 46. In a similar construction, the output of the comparator 38 is applied to a line 50, and a resistor 52 is connected between the power source 19 and the output line 50. The output of comparator 38 on line 50 is connected to the cathode of diode 62 whose anode is connected to the output line 46. The output voltage appearing on line 46 is applied, in series, through diode 54, a resistor 56, and a capacitor 60 to ground. A line 64 is connected at a junction between resistor 56 and capacitor 60 and may be considered the output of circuit 10 on which 5 detect and 5 disable signals appear Line 64 is connected to ground through a resister 66 and is connected to the cathode of diode 68, the anode of which is connected to a terminal 70 of a television stereo and SAP decoder 72 In operation, when the voltage appearing on line 64 goes high, this indicates that a voltage appears on line 34 within a desired signal amplitude window, the maximum and minimum thresholds set by pots 42 and 44.

The coordinated function of the comparators 37 and 38 may be appreciated by considering the effects of various voltages at line 34. For example, when the voltage appearing on line 34 exceeds the maximum voltage set by pot 42, comparator 37 turns "on", the output goes low and line 46 is connected to ground When line 46 is grounded for a predetermined time period and capacitor 60 is discharged, no appreciable voltage appears on the output line 64 and consequently diode 68 is forward biased which constitutes a disabling signal by transconductance through terminal 70. When the voltage appearing on line 34 drops below the maximum voltage set by pot 42 but is above the minimum voltage set by pot 44, the comparator 37 turns "off" and the voltage appearing on line 46 goes high. Thus, a current will flow through diode 54 and resistor 56 to charge the capacitor 60. Once the capacitor is fully charged, the signal appearing on line 64 goes high and constitutes the detect signal, and thus diode 68 is reverse biased which in turn maintains terminal 70 voltage high. When the voltage appearing on line 34 drops below the minimum voltage set by pot 44, the comparator 38 turns "on" and essentially connects line 50 to ground. When this occurs, line 46 is also grounded through diode 62, and after the capacitor 60 discharges, the voltage appearing on the output line 64 goes low which constitutes the disable signal.

The effect of the detect and disable signals are determined by diode 68 and resistor 66. When the detect signal (a high signal) appears on line 64, a constant voltage is applied across the resistance 66, the diode 68 is reverse biased, and the terminal 70 is connected to a substantially open circuit. This open circuit signal is interpreted by the decoder 72 to mean that a stereo signal (or a desired signal) is present and it switches to a stereo mode. When the voltage on line 64 goes low (a disable signal), after the full discharge of the capacitor 60, the diode 68 is forward biased and is connected to ground through the resistor 66. This condition at terminal 70 is interpreted by decoder 72 to indicate a mono signal and the decoder 72 switches to a mono mode of operation.

The capacitor 60 functions to delay transitions between the high detect signal and the low disable signal appearing on line 64. When the desired signal is detected, and the circuit 10 attempts to place a high detect signal on line 64, the current flowing through the resistor 56 will initially begin charging the capacitor 60. As the capacitor 60 is charged the voltage on line 64 will rise until it reaches the high level of the detect signal. Thus, eventually, the voltage on line 64 is established by a voltage division between resistors 56 and 66 and the rise time of the voltage on line 64 is determined by the RC constant established by resistor 56 and capacitor 60. When the desired signal at the input of circuit 10 suddenly disappears, the circuit 10 attempts to place a low disable signal on line 64. Initially, as the circuit switches from the detect signal to the disable signal, the capacitor 60 will discharge through resistor 66 which will delay the time of the transition as determined by an RC constant established by the capacitor 60 and the resistor 56.

As described above, the circuit 10 detects the presence or absence of a pilot signal in a TV program. As used herein, the terminology of "absence of a pilot signal" will be understood to include all conditions that would cause the circuit 10 to create the disable signal such as a condition in which a spurious signal is received at the pilot frequency for a time exceeding the selected time period at an amplitude exceeding the selected upper threshold amplitude. Likewise, a signal having the correct frequency and duration, but having an amplitude of less than the selected lower threshold amplitude, would be considered the "absence of a pilot signal". In the previously described embodiment, the tuned amplifier built around transistor 16 is tuned to amplify the pilot frequency of 15.734 khz and the pots 42 and 44 are set to provide maximum and minimum thresholds whereby the voltage on line 46 goes high only when the voltage appearing on line 34 corresponds to a deviation from the 4.5 MHZ carrier signal of between 4.5 and 5.5 KHZ. The capacitor 60 and the resistors 56 and 66 have magnitudes that are selected to introduce a switching time delay of about one millisecond. In this construction, if a 0.1 millisecond impulse signal was received that had a frequency of 15.734 khz at the composite baseband and had an amplitude corresponding to a deviation within the range of 4.5 to 5.5 khz, the capacitor 60 in combination with the resistors 56 and 66 would prevent the circuit 10 from producing the detect signal at line 64. Likewise, if a valid pilot signal was present, but it was lost for 0.1 milliseconds, the capacitor 60 would prevent the circuit 10 from switching from the detect signal to the disable signal.

With modifications, the circuit 10 would also be suitable for the detecting the presence of a second audio program (SAP) signal. A SAP signal has a carrier that produces a frequency of 78.67 khz in the composite baseband and an amplitude of corresponding to a deviation from the 4.5 megahertz carrier signal of 15 khz plus or minus 10% (13.5 khz to 16.5 khz). Thus, to adjust circuit 10 so that it will detect the presence or absence of a SAP signal, the capacitor 22 and inductor 24 are sized so that the amplifier associated with the bi-polar transistor 16 is tuned to 78.67 khz and will amplify only that frequency. To set the maximum permissible amplitude of the SAP carrier signal, resistor 42 is adjusted to an amplitude corresponding to a 16.5 khz deviation from the 4.5 megahertz carrier signal, and the lower amplitude limit is set by adjusting resistor 44 to an amplitude that corresponds to a 13.5 khz deviation. In this embodiment terminal 70 would be redefined as the SAP enable/disable terminal so that the decoder 72 would operate in a SAP mode and produce a SAP indicator signal at terminal 84 when the desired SAP signal is detected and would be disabled when the absence of a SAP signal (or an undesired signal) is detected. The decoder 72 is also shown with terminals 74 and 76 which, in the case, represent decoder outputs of stereo, mono or SAP signals.

Although a specific embodiment of the invention has been discussed in the above Detailed Description, it will be understood that the invention is capable of numerous rearrangements, modifications and substitutions of parts without departing from the scope of the invention as defined by the appended claims.

I claim:

1. In a television receiver for receiving a multichannel television sound signal, a signal detector for detecting the presence of a desired signal in a composite baseband input signal including said multichannel television sound signal in the BTSC format, said desired signal having a predetermined frequency and amplitude in a background of other signals, noise, and harmonics, said signal detector comprising:
   first means for receiving the composite baseband input signal, for detecting the desired signal having the predetermined frequency in the composite baseband input signal, and for producing a signal corresponding to the amplitude of the signals having the predetermined frequency; and
   second means for receiving the corresponding signal, for comparing the corresponding signal to a predetermined amplitude range that is defined by and between first and second thresholds and that corresponds to an acceptable amplitude range for the desired signal, for detecting when the amplitude of the corresponding signal is below the first threshold, for detecting when the amplitude of the corresponding signal is above the second threshold, and for producing a detect signal only when said corresponding signal is within said predetermined amplitude range between the first and second thresholds, whereby said detect signal is produced only when said composite baseband input signal includes signals within the acceptable amplitude range having the predetermined frequency.

2. The signal detector of claim 1 wherein said second means further comprises time delay means for producing the detect signal only when said corresponding signal remains within said predetermined range for a predetermined period of time.

3. The detector of claim 1 wherein said first means comprises filter means for separating said signals having the predetermined frequency from the composite baseband input signal.

4. The detector of claim 3 wherein said filter means comprises tuned amplifier means tuned to amplify only said signals having the predetermined frequency.

5. The detector of claim 3 wherein said filter means comprises:
   tuned amplifier means tuned to amplify only said signals having the predetermined frequency for receiving the composite baseband input signal and producing an amplified signal corresponding to said signals in the composite baseband input signal having the predetermined frequency; and
   rectifier means for rectifying the amplified signal and for producing the corresponding signal as a substantially DC signal whose amplitude corresponds in magnitude to the amplitude of the composite baseband input signals having the predetermined frequency.

6. In a television receiver for receiving a multichannel television sound signal, a signal detector for detecting the presence of a desired signal in a composite baseband input signal including said multichannel television sound signal, said desired signal having a predetermined frequency and amplitude in a background of other signals, noise and harmonics, said signal detector comprising:
   first means for receiving the composite baseband input signal for detecting signals having the predetermined frequency in the composite baseband input signal, and for producing a signal corresponding to the amplitude of the signals having the predetermined frequency; and
   second means for receiving the corresponding signal, for comparing the corresponding signal to a predetermined amplitude range that corresponds to an acceptable amplitude range for the desired signal, and for producing a detect signal only when said corresponding signal is within said predetermined amplitude range;
   said second means further comprising:
   a first comparator for receiving the corresponding signal and for producing an "on" signal when said corresponding signal has a magnitude exceeding a first threshold and an "off" signal when said corresponding signal has a magnitude of less than the first threshold;
   a second comparator for receiving the corresponding signal and for producing an "on" signal when said corresponding signal has a magnitude of less than a second threshold and an "off" signal when said corresponding signal has a magnitude exceeding the second threshold; and
   circuit means connected to receive signals from the first and second comparators for producing said detect signal when both of the first and second comparators produce said "off" signals indicating the presence of the desired signal in the composite baseband input signal and for producing a disable signal when either of the first and second comparators produces said "on" signal which indicates either the presence of an undesired signal or the absence of the desired signal in the composite baseband input signal.

7. The detector of claim 6 wherein said circuit means further comprises a resistance and capacitance circuit connected to the outputs of said first and second comparators for imposing a predetermined time delay in switching said circuit between producing the detect signal and producing the disable signal.

8. A method for detecting whether a composite baseband television signal includes a stereo composite signal that is frequency modulated on a 4.5 megahertz sound carrier signal and that includes a pilot signal having a frequency in the sound baseband of 15.734 khz and having an amplitude corresponding to a 5 khz deviation (plus or minus 10%) from the 4.5 mhz sound carrier signal, comprising:
   filtering signals having a frequency of about 15.734 khz from the composite baseband television signal to produce a filtered signal having a frequency of about 15.734 khz;

comparing the amplitude of the filtered signal to a predetermined range of amplitudes that is defined by and between first and second thresholds and that includes said amplitude corresponding to said 5 khz deviation from the 4.5 mhz sound carrier signal; and producing a detect signal indicating the presence of the pilot signal in the composite baseband television signal only when the filtered signal has an amplitude above the first threshold and below the second threshold within the predetermined range.

9. The method of claim 8 wherein said producing step comprises:

timing the presence of the filtered signals that have said amplitude within the predetermined range; and producing the detect signal when the filtered signals have said amplitude within the predetermined range for a predetermined period of time.

10. The method of claim 8 wherein said filtering step comprises tuned amplification of the composite baseband television signal to amplify only frequencies of about 15.734 kilohertz in the sound baseband.

11. The method of claim 8 wherein said comparing step comprises:

rectifying the filtered signal to produce a substantially DC signal whose amplitude magnitude corresponds to the amplitude magnitude of the filtered signal; and comparing the amplitude of the substantially DC signal to the predetermined range of amplitudes.

12. The method of claim 8 wherein said comparing and producing steps comprise:

rectifying the filtered signal to produce a substantially DC signal hose amplitude corresponds to the amplitude of the filtered signal;

producing a first "on" signal when the amplitude of the substantially DC signal exceeds a first threshold or a first "off" signal when the substantially DC signal amplitude is less than the first threshold;

producing a second "on" signal when the amplitude of the substantially ; DC signal is less than a second threshold or a second "off" signal when the substantially DC signal amplitude is greater than the second threshold; and producing the detect signal only when both the first and second "off" signals are produced.

13. A method for detecting whether a composite baseband television sound signal includes a second audio signal that is frequency modulated on a 4.5 mhz sound carrier signal and that includes a SAP carrier signal having a frequency in composite baseband of about 78.67 khz and having an amplitude corresponding to a deviation (injection) of 15 khz from the 4.5 mhz sound carrier signal, comprising:

filtering signals having said frequency of about 78.67 khz from the composite baseband of the television signal to produce a filtered signal having a frequency of about 78.67 khz;

comparing the amplitude of the filtered signal to a predetermined range of amplitudes that is defined by and between first and second thresholds and that includes said amplitude corresponding to said 15 khz deviation from the 4.5 mhz sound carrier signal;

producing a detect signal indicating the presence of the SAP carrier signal in the television signal only when the filtered signal has an amplitude above the first threshold and below the second threshold within the predetermined range of amplitudes.

14. The method of claim 13 wherein said comparing step comprises:

rectifying the filtered signals to produce a substantially DC signal whose amplitude corresponds to the amplitude of the filtered signals; and comparing the amplitude of the substantially DC signal to the predetermined range of amplitudes.

15. The method of claim 13 wherein said comparing and producing steps comprise:

rectifying the filtered signal to produce a substantially DC signal whose amplitude corresponds to the amplitude of the filtered signals;

producing a first "on" signal when the amplitude of the substantially DC signal exceeds a first threshold or a first "off" signal when the substantially DC signal amplitude is less than the first threshold;

producing a second "on" signal when the amplitude of the DC signal is less than a second threshold or a second "off" signal when the substantially DC signal amplitude is greater than the second threshold; and producing the detect signal only when both the first and second "off" signals are produced.

16. A method for detecting whether a composite baseband television signal includes a second audio program that is frequency modulated on a 4.5 mhz sound carrier signal and that includes a SAP carrier signal having a frequency in composite baseband of about 78.67 khz and having an amplitude corresponding to a deviation (injection) of 15 khz from the 4.5 mhz sound carrier signal, comprising:

filtering signals having said frequency of about 78.67 khz from the composite baseband of the television signal to produce a filtered signal having a frequency of about 78.67 khz;

comparing the amplitude of the filtered signal to a predetermined range of amplitudes that include said amplitude corresponding to said 15 khz deviation from the 4.5 mhz sound carrier signal;

timing the presence of the filtered signals that have said amplitude within the predetermined range of amplitudes; and producing a detect signal indicating the presence of the SAP carrier signal in the television signal only when the filtered signals have said amplitude within the predetermined range of amplitudes, and when the filtered signals have said amplitude within the predetermined range of amplitudes for a predetermined period of time.

17. A method for detecting whether a composite baseband television signal includes a second audio program that is frequency modulated on a 4.5 mhz sound carrier signal and that includes a SAP carrier signal having a frequency in composite baseband of about 78.67 khz and having an amplitude corresponding to a deviation (injection) of 15 khz from the 4.5 mhz sound carrier signal, comprising:

filtering signals having said frequency of about 78.67 khz from the composite baseband of the television signal to produce a filtered signal having a frequency of about 78.67 khz by means of tuned amplification of the composite baseband signal to amplify only frequencies of about 78.67 khz;

comparing the amplitude of the filtered signal to a predetermined range of amplitudes that include said amplitude corresponding to said 15 khz deviation from the 4.5 mhz sound carrier signal; and
producing a detect signal indicating the presence of the SAP carrier signal in the television signal only when the filtered signals have an amplitude within the predetermined range of amplitudes.

* * * * *